(12) United States Patent
Novak et al.

(10) Patent No.: US 11,134,382 B2
(45) Date of Patent: Sep. 28, 2021

(54) METHOD OF AUTHENTICATING A TRANSPONDER IN COMMUNICATION WITH A SERVER

(71) Applicant: EM Microelectronic-Marin SA, Marin (CH)

(72) Inventors: Tomas Novak, Libeznice (CZ); Julian Guilloux, Colombier (CH); Stephanie Salgado, La Neuveville (CH)

(73) Assignee: EM Microelectronic-Marin SA, Marin (CH)

( * ) Notice: Subject to any disclaimer, the term of this patent is extended or adjusted under 35 U.S.C. 154(b) by 281 days.

(21) Appl. No.: 16/267,406

(22) Filed: Feb. 5, 2019

(65) Prior Publication Data

US 2019/0261181 A1 Aug. 22, 2019

(30) Foreign Application Priority Data

Feb. 21, 2018 (EP) .................................... 18157856

(51) Int. Cl.
*H04L 29/06* (2006.01)
*H04W 12/06* (2021.01)
(Continued)

(52) U.S. Cl.
CPC ......... *H04W 12/068* (2021.01); *H04L 9/0863* (2013.01); *H04L 9/3242* (2013.01);
(Continued)

(58) Field of Classification Search
CPC . H04L 63/0838; H04L 63/08; H04L 63/0876; H04L 9/3242; H04L 9/0863;
(Continued)

(56) References Cited

U.S. PATENT DOCUMENTS 9,002,750 B1   4/2015 Chu et al.
9,379,894 B1*  6/2016 Luo .......................... H04L 9/321
(Continued)

FOREIGN PATENT DOCUMENTS

CN   101454785 A   5/2009
CN   102984127 A   3/2013
(Continued)

OTHER PUBLICATIONS

European Search Report dated Jul. 12, 2018 in European Application 18157856.8 filed on Feb. 21, 2018 (with English Translation of Category of Cited Documents & Written Opinion).
(Continued)

*Primary Examiner* — Alexander Lagor
*Assistant Examiner* — Vu V Tran
(74) *Attorney, Agent, or Firm* — Oblon, McClelland, Maier & Neustadt, L.L.P.

(57) ABSTRACT

A method of authenticating a transponder in communication with a server. The method includes the steps of defining a word in the transponder with a previous state of a counter of the transponder, incremented by a random number generated in the transponder, calculating a one-time password in the transponder with the aid of an HOTP algorithm and of a secret key on the basis of the word, transmitting the word and the one-time password to the server, calculating another one-time password in the server with the word received from the transponder by the HOTP algorithm and with one and the same secret key, and checking whether the passwords are identical so as to authenticate the transponder and authorize access to a site determined by the server.

11 Claims, 3 Drawing Sheets

(51) Int. Cl.
*H04L 9/08* (2006.01)
*H04L 9/32* (2006.01)
*H04W 12/082* (2021.01)
*H04W 12/108* (2021.01)

(52) U.S. Cl.
CPC ....... *H04L 63/0838* (2013.01); *H04W 12/082* (2021.01); *H04W 12/108* (2021.01)

(58) Field of Classification Search
CPC ............. H04W 12/068; H04W 12/082; H04W 12/108
See application file for complete search history.

(56) References Cited

U.S. PATENT DOCUMENTS

2007/0250923 A1* 10/2007 M'Raihi ............... H04L 9/3228
726/18
2012/0008767 A1* 1/2012 Smith ................... H04L 9/3273
380/28
2014/0133626 A1 5/2014 Jang et al.
2014/0133656 A1* 5/2014 Wurster ................ H04W 12/08
380/270
2017/0206367 A1* 7/2017 Six ........................ G06F 21/121

FOREIGN PATENT DOCUMENTS

| CN | 104247369 A | 12/2014 |
|---|---|---|
| EP | 2 817 937 A2 | 12/2014 |
| WO | WO 2013/126759 A2 | 8/2013 |

OTHER PUBLICATIONS

Combined Chinese Office Action and Search Report dated Mar. 2, 2021 in Chinese Patent Application No. 201910132582.1 (with English translation of Office Action), 16 pages.

* cited by examiner

METHOD OF AUTHENTICATING A TRANSPONDER IN COMMUNICATION WITH A SERVER

CROSS-REFERENCE TO RELATED APPLICATION

This application claims priority to European Patent Application No. 18157856.8 filed on Feb. 21, 2018, the entire disclosure of which is hereby incorporated herein by reference.

TECHNICAL FIELD

The present invention relates to a method of authenticating a transponder in communication with a server so as to authorize access to a determined site.

TECHNOLOGICAL BACKGROUND

With the deployment of the Internet of Things IoT, there are more and more things or products that are equipped with transponders of any communication type. These transponders may be for example of the NFC near-field, or indeed also UHF, communication type. This makes it possible to improve the experience of customers when searching for a thing or product to purchase or to investigate. Such transponders are for example enclosed or encapsulated in sportswear, personal equipment or any other object. The user can type in or select the desired product to gain access to special offers, such as video on the Internet network (Web), discounts or other.

The offer may or may not generally be personal. The provider of services or the supplier of the offer must be certain that the transponder is recognized or identified for access to the on-line service. In other words, the service provider must usually verify the authenticity of the transponder before authorizing access to the desired site.

Cryptographic interrogation-response protocols are well-known solutions for authenticating a transponder with its identifier. However, this requires a bidirectional communication, which usually obliges the server to initiate the communication. However, in the context of intelligent things, it is more practical or appropriate to leave the consumer or user in charge, leaving the latter to initiate the communication by powering the transponder with a reader, such as a mobile telephone in proximity for example. This implies that the link is an up-link only. This therefore signifies from the transponder to the server only.

Interrogation-response protocols are not appropriate in this situation. Instead of this, the mechanisms are based on the generation of a one-time password (OTP). This allows authentication of the transponder with a one-pass protocol.

In the OTP one-time password communication protocol, the transponder and the server can share one and the same secret key. An authentication word defined as Nonce is a generated word which can only be used once in cryptography. It is at the minimum composed of a state of a counter and can be associated with an identifier of the transponder. According to a communication protocol of the OTP type, provision is made for the following steps:

The transponder and the server share a secret key K.
The transponder generates a defined word Nonce and processes this Nonce word together with the key K through a cryptography algorithm. A typical algorithm used for this application is generally the HOTP (Hash-based One-time Password) algorithm.
The transponder dispatches the Nonce word and the result of the algorithm to the server.
The server performs the same operation and verifies the consistency of the data dispatched by the transponder. The server must also verify the consistency of the Nonce word.

It should be noted that the algorithm used to calculate the one-time password OTP is based on the well-known HOTP algorithm, which is itself based on the HMAC algorithm. This HOTP algorithm is also defined under the reference RFC 4226. Information about this algorithm can be found for example at the site http://www.rfc-base.org/txt/rfc-4226.txt or at the site https://en.m.wikipedia.org/wiki/HMAC-based_One-time_Password_Algorithm.

FIG. 1 represents steps of a traditional method of authenticating a transponder by a server so as to authorize it to access a site defined in relation to a product or thing on which the transponder is disposed. FIG. 1 repeats the different information mentioned hereinabove.

The Nonce word, which can incorporate the identifier of the transponder (UID) and the state of a counter (CNT) of the transponder, can initially be equal to 0 if the identifier is not introduced into the Nonce word and the counter starts at zero. Of course, it is also possible to start with a non-zero value of the counter. Once the transponder is in communication, the transponder calculates a one-time password defined in FIG. 1 by OTP by means of the HOTP algorithm and of the secret key K on the basis of the Nonce word. For the first use, the OTP result of the calculation by the HOTP algorithm is transmitted with the Nonce word comprising the state of the internal counter to the server. Normally, transmission to the server passes via an interrogation or reading device, which may be portable such as a mobile telephone. This mobile telephone is placed in proximity to the transponder for a connection, for example NFC, to serve as intermediary with the server.

The server receives, from the mobile telephone in communication with the transponder, the Nonce word and the OTP result, which corresponds to the one-time password (OTP). The server will also calculate the one-time password OTP2 by means of the HOTP algorithm on the basis of the Nonce word received and with the secret key K, which must be identical to that of the transponder for it to be recognized. Thus the server may be deemed to trust the transponder if the one-time password recalculated OTP2 is equal to the one-time password OTP received from the transponder. Under these conditions, the transponder is indeed authenticated. In the converse case, the transponder is proved to be non-authentic and the communication does not continue.

For a second use or second reading, the counter of the transponder is incremented by one unit. Thus the previous state of the Nonce counter becomes Nonce+1. A new calculation by the HOTP algorithm with the secret key K is performed with the new Nonce word to give the new one-time password OTP. A transmission of the Nonce word and of the OTP result is performed so that the server receives this new Nonce word, different from the previous Nonce word, and the new password OTP. The server will calculate the new one-time password OTP2, again by means of the HOTP algorithm, on the basis of the Nonce word received and with the secret key K, which must be identical to that of the transponder for it to be recognized. If the one-time password recalculated OTP2 is equal to the one-time password OTP received from the transponder, the transponder is indeed authenticated and access to a determined site linked with the product of the transponder is authorized.

Several successive uses can occur, each time with an increment of one unit of the counter of the transponder before calculation of the password by the algorithm and transmission of the result and of the state of the counter. A verification of the data of the transponder is still performed in the server to authorize it to access a determined site if authenticated.

It is noted that the counter is incremented each time by one unit at each reading or use. This Nonce word of the transponder is a crucial element, since it avoids any replay attack. In the case where the transponder generates the same value of the Nonce word twice for two successive readings, it is possible to suffer such an attack by spying and recording of the Nonce, OTP pairs. This may make it possible to repeat this sequence subsequently even in the absence of the transponder.

For these reasons, the Nonce is typically a counter value with an increment stepsize of 1. Without loss of generality, this may be considered to be an incremental value with an initial value equal to zero. With such a counter, a server can easily identify if the pair (Nonce, OTP) is a fresh pair or arises from a replay attack, by checking that the new Nonce is strictly larger than the last accepted Nonce.

Although the previous protocol makes it possible to verify the authenticity of a transponder and is also a proof test of replay attacks, there are a few items of information that a consumer might not wish to disclose. In particular, it is easy to see that the Nonce word indicates the number of times that the transponder has been used and read. This indicates how many times the service or site has been accessed by the consumer. Depending on the application, these items of information may be sensitive and violate the consumer's privacy, thus constituting a drawback.

In this regard, it is possible to cite U.S. Pat. No. 8,750,514 B2, which performs the steps of the above-mentioned method with each time an increment of one unit of the counter of the NFC device for the calculation of the one-time password with the state of the counter incremented by one unit at each reading or use, thus constituting a drawback.

SUMMARY OF THE INVENTION

The aim of the invention is therefore to alleviate the drawbacks of the above-mentioned prior art by providing a method of authenticating a transponder in communication with a server so as to authorize access to a determined site, which makes it possible to avoid any replay attack while guaranteeing protection of the consumer when accessing the site determined as a function of the product or of the thing to be found.

To this effect, the invention relates to a method of authenticating a transponder in communication with a server, the transponder comprising a processing unit linked to a memory unit, to a counter and to wireless linking means so as to establish a communication with the server, wherein the method comprises the steps of:

defining a Nonce word in the processing unit of the transponder during a communication operation, on the basis of a previous state of the counter of the transponder, incremented by a random number generated in the processing unit, calculating a one-time password in the processing unit of the transponder with the aid of a dedicated algorithm, the said algorithm being stored, and of a secret key on the basis of the Nonce word_generated in the processing unit, transmitting the Nonce word and the one-time password to the server, calculating another one-time password in the server on the basis of the Nonce word received from the transponder by means of one and the same dedicated algorithm identical to that of the transponder and of a secret key, and checking whether the other one-time password is identical to the one-time password received from the transponder so as to authenticate the transponder and authorize access to a site determined by the server by having verified the knowledge of the same secret key used to calculate the passwords in the transponder and the server.

To this effect, the invention relates also to a method of authenticating a transponder in communication with a server, the transponder comprising a processing unit linked to a memory unit, to a counter and to wireless linking means so as to establish a communication with the server, wherein that the method comprises the steps of:

defining a Nonce word in the processing unit of the transponder during a communication operation, on the basis of a previous state of the counter of the transponder, decremented by a random number generated in the processing unit, calculating a one-time password in the processing unit of the transponder with the aid of a dedicated algorithm, the said algorithm being stored, and of a secret key on the basis of the word Nonce generated in the processing unit, transmitting the Nonce word and the one-time password to the server, calculating another one-time password in the server on the basis of the word Nonce received from the transponder by means of one and the same dedicated algorithm identical to that of the transponder and of a secret key, and checking whether the other one-time password is identical to the one-time password received from the transponder so as to authenticate the transponder and authorize access to a site determined by the server by having verified the knowledge of the same secret key used to calculate the passwords in the transponder and the server.

Particular steps of the method of authenticating a transponder are defined in dependent claims 2 to 8.

An advantage of the method of authenticating a transponder resides in the fact that the counter of the transponder is not incremented by a single unit at each reading but by a non-zero random number, random number, which is an integer number ranging from 1 to M. Preferably, M may be a value equal to 8 or some other value. Thus, there is no longer any direct dependence between the number of readings of the transponder and the number of times that the counter has been incremented. Nonetheless, the server is still able to verify that the Nonce word received from the transponder is a new value strictly larger than the previous value of the Nonce word of a previous use or reading.

Advantageously, the larger the margin of possible steps (number of uses), the smaller the correlation between the Nonce and the uses.

Advantageously, the initial value of the counter before the first use or reading can be determined randomly non-zero and larger than 0.

By virtue of the method of authenticating the transponder, one succeeds in dissociating the Nonce word from the number of uses. This does not require any down-link or any additional cryptography operations, such as strong concealment of the Nonce word for example by encrypting it.

BRIEF DESCRIPTION OF THE FIGURES

The aims, advantages and characteristics of the method of authenticating a transponder in communication with a server will become better apparent in the following description on the basis of at least one nonlimiting form of execution illustrated by the drawings in which.

DETAILED DESCRIPTION OF THE INVENTION

In the following description, all the components used for the method of authenticating a transponder in communication with a server according to the invention, which are well known to the person skilled in the art in this technical field, will be recited in a simplified manner only.

Figure 2:
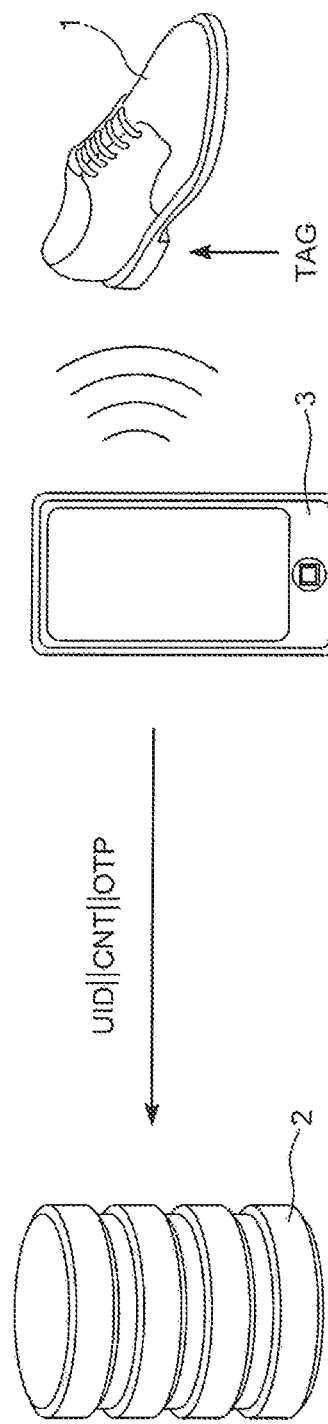

FIG. 2 schematically represents the various elements of a system for authenticating a transponder for a communication with a server 2. The system comprises at least one transponder TAG disposed on a thing or a product 1, such as an item of sportswear or a shoe in the present case or any other product or object of daily life. Generally, the transponder TAG, which comprises wireless linking means for establishing a communication with the server 2, can be awoken or activated by a reading device 3 for example in proximity for an NFC link. This reading device can be a mobile communication unit such as a mobile telephone or portable tablet 3. This mobile telephone or portable tablet 3 can establish a communication with a server 2 in order to start the method of authenticating a transponder TAG so as to allow it once authenticated to gain access to a determined site by way of the server 2. The determined site relates to the product 1 on which the transponder TAG is disposed.

On the approach of the mobile communication unit 3, such as a mobile telephone 3 in FIG. 2, to the transponder TAG, the latter can be powered by rectifying the telephone's sensed interrogation signal. Once awoken, the transponder can perform the operations of calculating a one-time password (OTP) on the basis of a state of an internal counter (CNT) and optionally of an identifier (UID) of the product or thing 1. In a processing unit, not represented, such as a logic unit or a microprocessor, which is clocked by an integrated oscillator, a calculation of the one-time password can be performed by means of a defined HOTP algorithm, which is stored in a memory unit linked to the processing unit.

The transponder TAG transmits, in a one-way communication, an information signal comprising at least the state of the counter CNT, which is a value of the Nonce word, and the one-time password OTP calculated by the HOTP algorithm by means of at least the state of the counter with the aid of the secret key K, which is shared by the server 2. Preferably, the one-time password OTP can be calculated on the basis of the state of the counter CNT and of the identifier UID of the product or thing on which the transponder TAG is disposed. The information signal will therefore comprise the state of the counter CNT, the identifier UID and the one-time password OTP.

Figure 3:
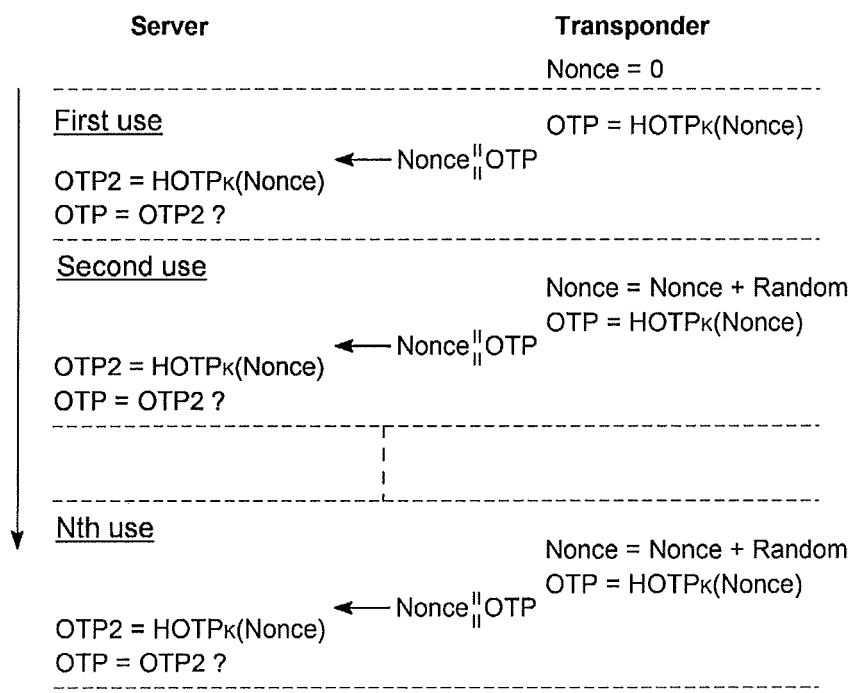
FIG. 3 represents the steps of a method of authenticating a transponder in communication with a server according to the invention.

Reference is now made to FIG. 3 for a better understanding of the method of authenticating a transponder in communication with a server for its authentication.

Figure 1:
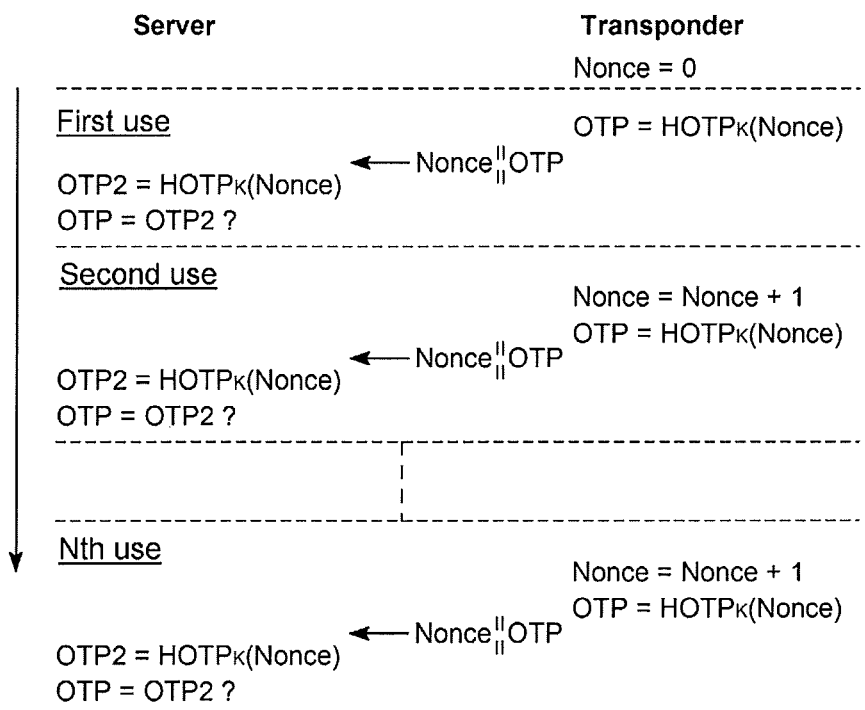
FIG. 1 already cited represents the steps of a method of authenticating a transponder in communication with a server of the prior art, FIG. 2 schematically represents the components for a communication between a transponder mounted on a product or a thing and a dedicated server to authenticate it according to the invention.

FIG. 1 represents steps of a traditional method of authenticating a transponder by a server so as to authorize it to access a site defined in relation to a product or thing on which the transponder is disposed. FIG. 3 repeats the various items of information mentioned hereinabove.

In this FIG. 3, the value of the Nonce word, as indicated with reference to FIG. 1 of the prior art, can incorporate the identifier of the transponder (UID) and the state of a counter (CNT) of the transponder. This first value of the Nonce word can initially be equal to 0 if the identifier UID is not introduced into the Nonce word and with the counter starting at zero. However, this value of the Nonce word can at the start also be of an initial value greater than 0 and obtained on the basis of a random number generated in the transponder. During the transmission of the value of the Nonce word and if the identifier UID is also transmitted, the information item regarding the identifier may be situated in the high-order bits MSbits of the Nonce word, whilst the state of the counter may be in the low-order bits LSbits.

Once interrogated or in communication, the transponder calculates a one-time password defined in FIG. 3 by OTP by means of the HOTP algorithm and of the secret key K on the basis of the value of the Nonce word. For the first use, the OTP result of the calculation by the HOTP algorithm is transmitted to the server with the value of the Nonce word comprising the state of the internal counter and optionally the identifier of the transponder. For example, the transmission to the server can pass via an interrogation or reading device, which can be portable such as a mobile telephone or a computer tablet. This mobile telephone is placed in proximity to the transponder for an NFC connection and to serve as intermediary with the server.

The server receives, from the mobile telephone in communication with the transponder, the Nonce word and the OTP result, which is the one-time password (OTP). The server will also calculate by means of the HOTP algorithm the one-time password OTP2 on the basis of the Nonce word received and with the secret key K, which must be identical to that of the transponder for it to be recognized. Thus the server may be deemed to trust the transponder if the one-time password recalculated OTP2 is equal to the one-time password OTP received from the transponder. Under these conditions, the transponder is indeed authenticated, since the knowledge of the secret key has indeed also been verified between the two entities. In the converse case, the transponder is proved to be non-authentic and the communication does not continue.

For a second use or second reading, the counter of the transponder is incremented by a random number (Random). Thus the previous state of the Nonce counter becomes Nonce+Random. A new calculation by the HOTP algorithm with the secret key K is performed with the new Nonce word to give the new one-time password OTP. A transmission of the Nonce word and of the OTP result is performed so that the server receives this new Nonce word, different from the previous Nonce word, and the new password OTP during the second use or reading.

The server will calculate again by means of the HOTP algorithm the new one-time password OTP2 on the basis of the Nonce word received and with the secret key K, which must be identical to that of the transponder for it to be recognized. If the one-time password recalculated OTP2 is equal to the one-time password OTP received from the transponder, and if the value of the Nonce word is greater than the last value of the valid Nonce word, the transponder is indeed authenticated and access to a determined site linked with the product of the transponder is authorized during this second use or reading.

These operations can repeat N times for N uses or readings. At each reading of the transponder, the previous Nonce authentication word is incremented by another random number (RANDOM) generated in the processing unit of the transponder before the calculation of the one-time password to be transmitted.

The random number RANDOM generated and added to the previous Nonce authentication word for each new reading lies between 1 and M, which is an integer number greater than 1. The number M can be equal for example to 8, but can take some other value according to a programming to be performed in the transponder. As this does not entail an increment of a single unit of the Nonce word at each reading, this Nonce word is decorrelated from the number of readings, thus guaranteeing the user some security.

By way of nonlimiting example, the second Nonce word for a second reading can equal Nonce+6, where 6 is the random number generated in the transponder. If the first Nonce word is 0, this gives 6 for the second Nonce word. For a third reading, the third Nonce word can equal Nonce+5, thus giving 11 for the third Nonce word to be transmitted, with the one-time password OTP calculated with the Nonce word and with the secret key. The addition of another random number to the previous Nonce word is performed at each new reading until the Nth reading and so on and so forth.

On reception of each Nonce word and of the one-time password OTP, the server will verify that the Nonce word is still greater than the previous Nonce word received during a previous reading.

Privatization of the user is a key point in growing the IoT market. Thus with a fixed step of the counter generating notably the Nonce word, it does not matter who may know how many times and frequently a reading by the server on a site of the product is performed.

It should also be noted that the counter with each addition of a random number at each new reading may again be at the maximum possible count number and pass back through the value 0, which may pose a problem. Under these conditions, it may be envisaged to fix an initial value of the counter to define the Nonce word. This initial value can be generated with a first random number defined between 1 and N. The number N is chosen in such a way as to be several orders of magnitude lower than the maximum count number of the counter.

To establish the communication between the transponder and the server, the server needs to know the initial value of the counter. This can be solved in at least two ways:
- the initial value is a deterministic function of the identity of the transponder, or
- the initial value is communicated at the first communication between the transponder and the server.

As indicated hereinabove, there may be a risk of overflow or overload of the Nonce word, as well as the Nonce word returning to a value zero. In this situation, the server will systematically reject the transponder, given that the Nonce word will appear smaller than any value whatsoever.

To solve this problem, provision may be made for the size in bits of the Nonce word to be such that overflow requires a large number of uses of the transponder and the initial value of the Nonce word MSbits may be forced to 0. In a nonlimiting example, it is possible to take a transponder which must not be used more than 10 000 times. Once it is possible to encode the Nonce word on 4 bytes, it is necessary to establish the initial Nonce word at a value between 0 and 0xFFFF, and to establish a stepsize between 1 and 0xFFFF, thus corresponding between 1 and M for the determined random value. The Nonce word can only reach the value 0x2710D8EF, even after 10 000 usages, in the unlikely situation of taking steps of size 0xFFFF each time. Thus, overdimensioning the Nonce word makes it possible to avoid premature overflow of the Nonce word at the maximum possible value.

It should be noted that this risk of overflow also exists with an increment of 1 of the counter at each use, but it is managed in a trivial manner, just by verifying that the counter has not reached the maximum value. In the case of a random stepsize (RANDOM) added to the Nonce word at each reading, it is necessary to be more prudent in order for there not to be a risk of overshooting the maximum value of the counter. It may be fixed that at each reading the Nonce word is incremented by a random number RANDOM between 1 and M, where M may for example be defined at 8, but can also be defined at some other value, such as 16, 32, 64 as a function of the count size of the counter. It may be admitted that the count size of the counter is P times greater than the random increment M at each reading. The number P, which is an integer number, can be at least equal to 256 (FF) preferably, or indeed at least 4096 (FFF) or 65536 (FFFF) times greater than the number M.

As described hereinabove, the present invention makes it possible to dissociate the Nonce word from the number of uses or of readings, and it is easy to put into practice. Moreover, this does not require any down-link or any additional cryptography operations to conceal the Nonce word during transmission from the transponder to the server.

It is also possible to envisage defining a Nonce word in the processing unit of the transponder in communication, on the basis of a previous state of the counter of the transponder, which is decremented by a random number generated in the processing unit. In this typical case, provision may be made to initialize the Nonce word of the state of the counter to its maximum value for example and to perform at each reading a decrement by a random number determined in the processing unit. The server will therefore check that, at each reception of the information regarding the Nonce word and the OTP, there is indeed a decrement of the Nonce word with respect to a previous value received of the Nonce word.

It should further be noted that instead of a mobile communication unit, such as a telephone or a tablet 3, it is possible to envisage the use of a remote communication unit for a communication by UHF signals with the transponder. This UHF communication unit may be an entrance gate to a ski installation, a motorway toll station or diverse other objects, linked to a server in a wired or wireless manner.

On the basis of the description which has just been given, several variants of the method of authenticating a transponder in communication with a server according to the invention can be conceived by the person skilled in the art without departing from the scope of the invention defined by the claims. The transponder can be of the passive type, or indeed of the active type with its own energy source, which can be a battery, or a solar cell or a thermoelectric generator.

The invention claimed is:

1. A method of authenticating a transponder in communication with a server, the transponder comprising processing circuitry linked to a memory, to a counter, and to wireless linking means to establish communication with the server, wherein the method comprises:

generating a new value of the counter of the transponder to be equal to a previous value of the counter plus a new random number generated in the processing circuitry, generating a Nonce word in the processing circuitry of the transponder during a communication operation, based on the generated new value of the counter of the transponder, calculating a first one-time password in the processing circuitry of the transponder using a dedicated algorithm, the dedicated algorithm being stored, and using a secret key and the Nonce word generated in the processing circuitry, transmitting the Nonce word and the first one-time password to the server, calculating a second one-time password in the server based on the secret key and the Nonce word received from the transponder, using the dedicated algorithm identical to that of the transponder, and checking whether the calculated second one-time password is identical to the first one-time password received from the transponder so as to authenticate the transponder and authorize access to a site determined by the server by having verified knowledge of the secret key used to calculate the first one-time password in the transponder and the second one-time password in the server.

2. The method of authenticating a transponder according to claim 1, wherein before a first reading of the transponder, initializing the Nonce word to a first value, which can be defined to be zero or a value randomly determined in the processing circuitry of the transponder.

3. The method of authenticating a transponder according to claim 1, wherein the step of generating the Nonce word further comprises including, in the Nonce word, an identifier of the transponder as a function of the product on which the transponder is placed.

4. The method of authenticating a transponder according to claim 1, further comprising at each reading of the transponder, generating a new value of the counter of the transponder to be equal to the previous value of the counter plus the newly generated random number, which is between 1 and M, where M is an integer.

5. The method of authenticating a transponder according to claim 4, wherein the new value of the counter of the transponder is at least P times greater than M, wherein P is an integer being at least equal to 256 times greater than M.

6. The method of authenticating a transponder according to claim 1, wherein the transmitting step includes transmitting the Nonce word and the first one-time password between the transponder and the server by way of a mobile communication unit in near-field link with the transponder.

7. The method of authenticating a transponder according to claim 1, wherein the transmitting step includes transmitting the Nonce word and the first one-time password between the transponder and the server by way of a communication unit in ultra high frequency link with the transponder.

8. The method of authenticating a transponder according to claim 1, wherein the step of calculating each of the first and second one-time passwords includes using an HOTP cryptography algorithm to calculate the passwords.

9. The method of claim 1, wherein the step of generating the new value of the counter includes generating the new random number, which is different each time the counter is updated.

10. A method of authenticating a transponder in communication with a server, the transponder comprising processing circuitry linked to a memory, to a counter, and to wireless linking means to establish communication with the server, wherein the method comprises:

generating a new value of the counter of the transponder to be equal to a previous value of the counter minus a new random number generated in the processing circuitry, generating a Nonce word in the processing circuitry of the transponder during a communication operation, based on the generated new value of the counter of the transponder, calculating a first one-time password in the processing circuitry of the transponder using a dedicated algorithm, the dedicated algorithm being stored, and using a secret key and the Nonce word generated in the processing circuitry, transmitting the Nonce word and the first one-time password to the server, calculating a second one-time password in the server based on the secret key and the Nonce word received from the transponder, using the dedicated algorithm identical to that of the transponder and of a secret key, and checking whether the calculated second one-time password is identical to the first one-time password received from the transponder so as to authenticate the transponder and authorize access to a site determined by the server by having verified knowledge of the secret key used to calculate the first one-time password, in the transponder and the second one-time password in the server.

11. A method of authenticating a transponder in communication with a server, the transponder comprising processing circuitry linked to a memory, to a counter, and to wireless linking means for establishing communication with the server, wherein the method comprises:

generating a new value of the counter of the transponder to be equal to a previous value of the counter plus a new random number generated in the processing circuitry, generating a Nonce word in the processing circuitry of the transponder during a communication operation, based on the generated new value of the counter of the transponder, calculating a first one-time password in the processing circuitry of the transponder using a dedicated algorithm, and using a secret key and the generated Nonce word, transmitting the Nonce word and the first one-time password to the server, calculating a second one-time password in the server based on the secret key and the Nonce word received from the transponder, using the dedicated algorithm identical to that of the transponder, and checking whether the second one-time password is identical to the first one-time password received from the transponder so as to authenticate the transponder and authorize access to a site determined by the server, wherein the generated new random number is between 1 and M, where M is an integer, and the generated new value of the counter is at least a predetermined multiple of M.

* * * * *

UNITED STATES PATENT AND TRADEMARK OFFICE
CERTIFICATE OF CORRECTION

PATENT NO. : 11,134,382 B2
APPLICATION NO. : 16/267406
DATED : September 28, 2021
INVENTOR(S) : Tomas Novak et al.

Page 1 of 1

It is certified that error appears in the above-identified patent and that said Letters Patent is hereby corrected as shown below:

In the Claims

In Column 10, Claim 10, Line 27, delete "transponder and of a secret key," and insert -- transponder, --, therefor.

In Column 10, Claim 10, Line 34, delete "password," and insert -- password --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*